E. S. MATTERN.
MACHINE FOR CUTTING SEED POTATOES.
APPLICATION FILED DEC. 26, 1916.

1,243,538.

Patented Oct. 16, 1917.
2 SHEETS—SHEET 1.

WITNESSES
H. T. Walker

INVENTOR
E. S. Mattern
BY
ATTORNEYS

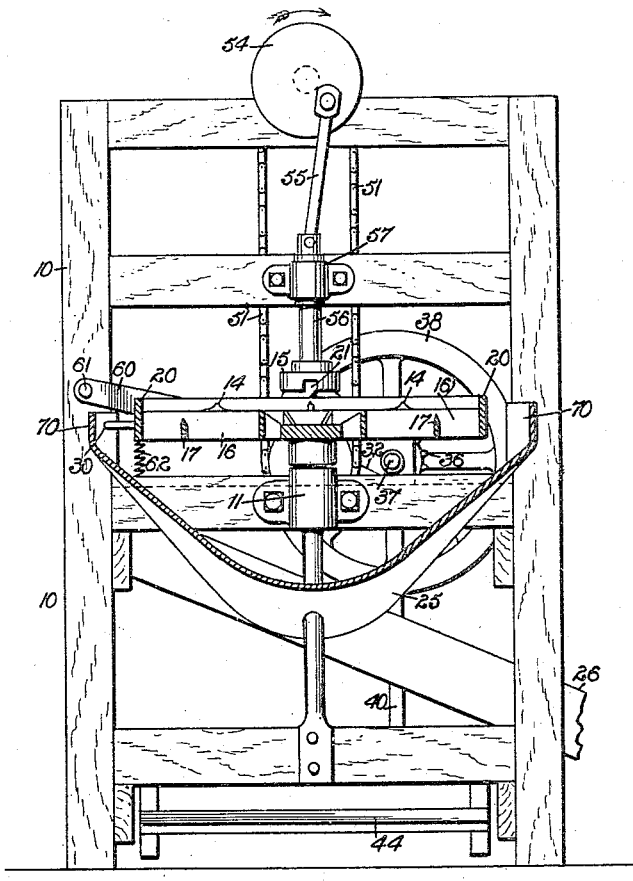

UNITED STATES PATENT OFFICE.

EDWIN STUART MATTERN, OF ALLENTOWN, PENNSYLVANIA.

MACHINE FOR CUTTING SEED-POTATOES.

1,243,538.   Specification of Letters Patent.   Patented Oct. 16, 1917.

Application filed December 26, 1916. Serial No. 138,801.

*To all whom it may concern:*

Be it known that I, EDWIN STUART MATTERN, a citizen of the United States, and a resident of Allentown, in the county of Lehigh and State of Pennsylvania, have invented a new and Improved Machine for Cutting Seed-Potatoes, of which the following is a full, clear, and exact description.

The object of the invention is to provide a new and improved machine for cutting seed potatoes rapidly and in a very simple and effective manner. Another object is to enable a single operator to run the machine and to feed the potatoes to be cut to the machine.

In order to accomplish the desired result use is made of a revoluble cutter disposed horizontally and provided with sets of knives, a plunger adapted to press the potatoes singly down on the cutters to cut each potato into a number of pieces, and means for intermittently rotating the cutter and reciprocating the plunger for the latter to descend at the time the cutter is at a standstill.

A practical embodiment of the invention is represented in the accompanying drawings forming a part of this specification, in which similar characters of reference indicate corresponding parts in all the views.

Fig. 3 is a sectional front elevation of the same on the line 3—3 of Fig. 1;

Fig. 4 is a rear elevation of the locking device for holding the cutter against accidental rotation during its period of rest; and Fig. 5 is an enlarged sectional elevation of a set of knives and the plunger in lowermost position relative to the knives.

Figure 1:
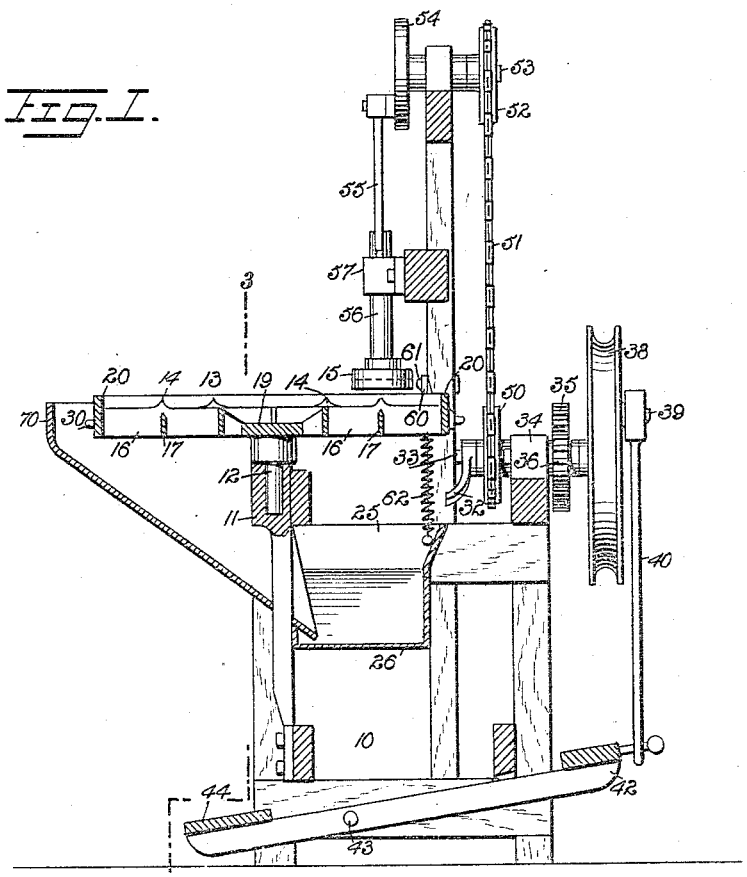
Figure 1 is a cross section of the machine for cutting seed potatoes, the section being on the line 1—1 of Fig. 2.
Figure 2:
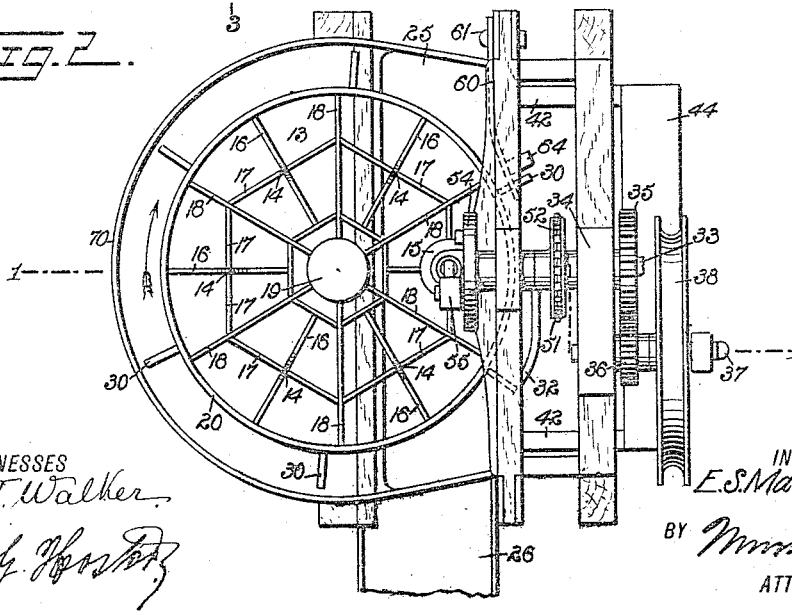
Fig. 2 is a plan view of the same.

The improved machine for cutting seed potatoes is mounted on a suitably constructed frame 10 provided with a bearing 11 (see Fig. 1) in which is journaled the vertically disposed shaft 12 of a revoluble cutter 13 in the form of a wheel disposed horizontally. The cutter 13 is provided with sets of knives each having a central impaling point 14 for impaling a potato thereon as hereinafter more fully explained, and the impaling points 14 of the several sets of knives are arranged in a circle to move successively in alinement with a plunger 15 arranged to reciprocate in a vertical direction to press each potato on a set of knives down on the same to cut each potato in a number of pieces. As illustrated in the drawings, each set of knives consists of a blade 16 arranged radially relatively to the wheel and having its cutting edge terminating at the middle in the impaling point 14. Blades 17 extend at angles from the radial blade 16 and the ends of the blades 17 are fastened to spokes 18 radiating from the hub 19 of the wheel to the rim 20 thereof. Each blade 16 is attached at its ends to the hub 19 and the rim 20 and the blades 16 and 17 have their cutting edges uppermost with the cutting edges of the blade 17 a short distance below the cutting edge and the point 14 of the blade 16. The plunger 15 is provided on its under side with a transversely extending groove 21 into which is adapted to pass the point 14 and the adjacent portions of the cutting edge of the blade 16 of the set of knives in register at the time with the plunger 15 at the back of the machine. When the plunger 15 moves downward it presses a potato impaled on the point 14 downward so that the cutting edges of the knife blades 16 and 17 cut the potato in pieces, but as the face of the plunger extends a distance above the cutting edges of the knife blade 17 at the time the plunger 15 reaches its lowermost position it is evident that the potato is not entirely cut through at the upper portion opposite the cutting edges of the blades 17 but is cut through entirely at the cutting edge of the blade 16 so that the potato remains in position on this set of knives until a complete revolution of the cutter has been made and this set of knives has returned into alined position relative to the plunger 15 with another potato impaled on the point 14. During the next descent of the plunger 15 the singly impaled potato on being pressed downward forces the previously and partly cut potato past the cutting edges of the blades 17 so that the pieces drop down into a hopper 25 having a sidewise extending chute 26 for delivering the cut pieces of potato to one side of the machine.

The plunger 15 moves into lowermost position at the time the cutter 13 is at rest and in order to impart an intermittent rotary motion to the cutter 13 and to reciprocate the plunger 15 in an up and down direction, the following arrangement is made: On the rim 20 of the cutter 13 are arranged outwardly extending pins 30 spaced equal distances apart and corresponding in number to the number of sets of knives of the cutter 13; thus, as shown in the drawings, six pins 30 are provided and a like number of sets of knives are arranged on the cutter 13. The pins 30 are adapted to be successively engaged by a cam 32 secured on the end of a shaft 33 journaled in suitable bearings 34 arranged on the back of the frame 10. The shaft 33 is provided with a gear wheel 35 in mesh with a pinion 36 secured on a driving shaft 37 likewise journaled in the bearing 34. This driving shaft 37 may be rotated by power but, preferably, the shaft is rotated by a treadle mechanism under the control of the operator standing in front of the machine and feeding the potatoes onto the impaling pins 14, as previously mentioned. For the purpose mentioned, the shaft 37 is provided with a fly wheel 38 having a crank pin 39 connected by a pitman with the rear end of a treadle 42 fulcrumed at 43 on the main frame 10. The foot piece 44 of the treadle 42 is within convenient reach of the operator standing in front of the machine to enable the operator to work the treadle 42 with a view to rotate the shaft 37 which by the pinion 36 and the gear wheel 35 imparts a rotary motion to the cam shaft 33. At each revolution of the cam shaft 33 the cam 32 engages one of the pins 30 and turns the cutter 13 so that another set of knives moves into alinement with the plunger 15.

On the cam shaft 33 is secured a sprocket wheel 50 connected by a sprocket chain 51 with a sprocket wheel 52 secured on a crank shaft 53 journaled in the upper portion of the frame 10. On the front end of the shaft 53 is secured a crank disk 54 connected by a pitman 55 with the plunger rod 56 of the plunger 15 and which plunger rod 56 is mounted to slide in bearings 57 attached to the frame-work 10. When the cam shaft 33 is rotated as previously explained then a rotary motion is given to the crank shaft 53 whereby an up and down movement is given to the plunger 15, it being understood that the plunger moves into lowermost position and starts on its upward movement during the time the cutter 13 is at a standstill.

In order to prevent the cutter 13 from accidentally turning during its period of rest, use is made of a locking arm 60 fulcrumed at 61 on the frame 10 and pressed in a downward direction by a spring 62 (see Fig. 4).

The arm 60 is provided at its free end with a hook 63 adapted to hook onto a pin 30, and the arm 60 is also provided with a lug 64 adapted to be engaged by the cam 32 immediately prior to the cam engaging the pin 30 in engagement at the time with the hook 63. Thus when the machine is running and the cutter 13 is at a standstill it is locked against movement by the hook 63 engaging a pin 30. Immediately prior to the cam 32 engaging the lock pin 30 it engages the lug 64 of the arm 60 and thus swings the latter upward out of locking engagement with the pin 30, and then the cam engages this unlocked pin 30 and turns the cutter 13 as previously explained. During this turning movement of the cutter 13 the next following pin 30 engages the arm 60 and swings the latter slightly upward until the hook engages the pin 30 at the time the cam 32 leaves the next pin 30 ahead.

The operation is as follows:

When the machine is running, the operator standing in front of the machine impales a potato on the impaling point 14 in front position at the time and while the cutter 13 is at rest. During the next revolution of the cutter 13 the impaled potato is carried along and the operator impales another potato on the next following impaling point 14. Now when an impaled potato moves into alinement with the plunger 15 and the latter descends at the time the cutter 13 is at rest then this impaled potato is forced downward and cut into two pieces by the cutting edge of the blade 16 and each of these two pieces is nearly cut into two pieces by the cutting edges of the blade 17 owing to the plunger 15 stopping a short distance above the cutting edges of the blade 17. Thus the potato remains on the set of cutting knives as previously explained for another revolution of the cutter 13 but the impaling point 14 as well as the cutting edge of the blade 16 are free to permit ready impaling of another potato on the set of cutting knives by the operator standing in front of the machine and at the time the said set of cutting knives reaches a front position. Thus on the next operation of the plunger on this impaled potato the previously and partly cut potato is forced downward by the downwardly moving second potato to cut the first potato in four pieces while the next potato remains in position on the set of knives until it is finally cut by another potato on the subsequent operation.

From the foregoing it will be seen that by the arrangement described the potatoes are very rapidly cut and without danger of bruising or otherwise injuring the potatoes.

It will also be noticed that a single operator can feed the potatoes to the machine and rotate the same.

A guard 70 forming part of the hopper 25 extends around the rim 20 and its pins 30 so as to protect the operator against injury when the machine is running.

Having thus described my invention, I claim as new and desire to secure by Letters Patent:

1. A machine for cutting seed potatoes, comprising a revoluble cutter provided with sets of knives, a plunger adapted to coact with the said knives to press the potatoes singly down on any one set of knives in alinement at the time with the plunger, and actuating means for imparting an intermittent rotary motion to the said cutter and to reciprocate the said plunger, the latter moving toward a set of knives at the time the cutter is at rest.

2. A machine for cutting seed potatoes, comprising a horizontally disposed cutter having sets of vertically disposed knives, the centers of the said sets of knives being arranged in a circle, a plunger mounted to reciprocate in an up and down direction and adapted to register with the said sets of knives to press the potatoes singly down on any one of the sets of knives in register at the time with the plunger, and actuating means for intermittently rotating the cutter and reciprocating the said plunger, the latter descending at the time the cutter is at rest.

3. A machine for cutting seed potatoes, comprising a horizontally disposed cutter having sets of vertically disposed knives, the centers of the said sets of knives being arranged in a circle and each set having a plurality of knives arranged radially and having a raised central point for impaling a potato thereon, a plunger mounted to reciprocate in an up and down direction and adapted to register with the said sets of knives to press the potatoes singly down on any one of the sets of knives in register at the time with the plunger, and actuating means for intermittently rotating the cutter and reciprocating the said plunger, the latter descending at the time the cutter is at rest.

4. A machine for cutting seed potatoes, comprising a horizontally disposed cutter having sets of vertically disposed knives, the centers of the said sets of knives being arranged in a circle, a plunger mounted to reciprocate in an up and down direction and adapted to register with the said sets of knives to press the potatoes singly down on any one of the sets of knives in register at the time with the plunger, a driven cam shaft provided with a cam arm adapted to engage the said cutter to impart an intermittent rotary motion to the same, a crank shaft driven from the said cam shaft and having a crank, and a pitman connecting the said crank with the said plunger to reciprocate the latter, the plunger descending at the time the cutter is at a standstill.

5. A machine for cutting seed potatoes, comprising a horizontally disposed cutter having sets of vertically disposed knives, the centers of the said sets of knives being arranged in a circle, a plunger mounted to reciprocate in an up and down direction and adapted to register with the said sets of knives to press the potatoes singly down on any one of the sets of knives in register at the time with the plunger, a driven cam shaft provided with a cam arm adapted to engage the said cutter to impart an intermittent rotary motion to the same, a crank shaft driven from the said cam shaft and having a crank, a pitman connecting the said crank with the said plunger to reciprocate the latter, the plunger descending at the time the cutter is at a standstill, and locking means controlled by the said cam and adapted to hold the cutter against accidental movement during its period of rest.

6. A machine for cutting seed potatoes, comprising a horizontally disposed cutter in the form of a wheel mounted to turn, the cutter having sets of vertical knives arranged in a circle, each set of knives comprising a pluralitly of radially arranged knives having a common raised center for impaling a potato thereon, radially arranged pins on the peripheral face of the cutter and spaced equal distances apart, a cam shaft having a cam adapted to engage the said pins to intermittently rotate the said cutter, a locking arm mounted to swing and adapted to engage the said pins to hold the cutter against turning during its period of rest, the said locking arm being adapted to be engaged by the said cam to lift the locking arm out of engagement with a pin immediately prior to the cam engaging the pin and turning the cutter, a plunger mounted to slide up and down and having its vertical axis coinciding with the raised centers of one of the sets of knives at the time the cutter is at rest, and a crank shaft rotating in unison with the said cam shaft and connected with the said plunger.

7. A machine for cutting potatoes, comprising a revoluble cutter having sets of knives, each set having an impaling point, means for intermittently operating the cutter, a reciprocating plunger above the cutter, means for operating the plunger to move it toward the cutter at the time the cutter is at rest, and a locking device for the cutter controlled by the cutter operating means.

8. A machine for cutting seed potatoes, provided with sets of knives, each set consisting of a radial knife having an impaling point, and knives extending from opposite sides of the radial knife, said knives being opposite the impaling point of the radial knife and having their cutting edges below the cutting edge of the said radial knife.

9. A machine for cutting seed potatoes, provided with sets of knives, each set consisting of a radial knife having an impaling point, and knives extending from the radial knife and having their cutting edges in a plane below that of the cutting edges of the radial knife and opposite the impaling point thereof, and a plunger adapted to coact with the said set of knives to cut a potato into pieces, the plunger being provided on its face with a groove for the reception of the high cutting edges of the said knives.

EDWIN STUART MATTERN.

Copies of this patent may be obtained for five cents each, by addressing the "Commissioner of Patents, Washington, D. C."